May 14, 1940.    P. W. STEPHENS    2,200,903
VALVE FOR PRESSURE COOKERS
Filed Feb. 4, 1937    2 Sheets-Sheet 1
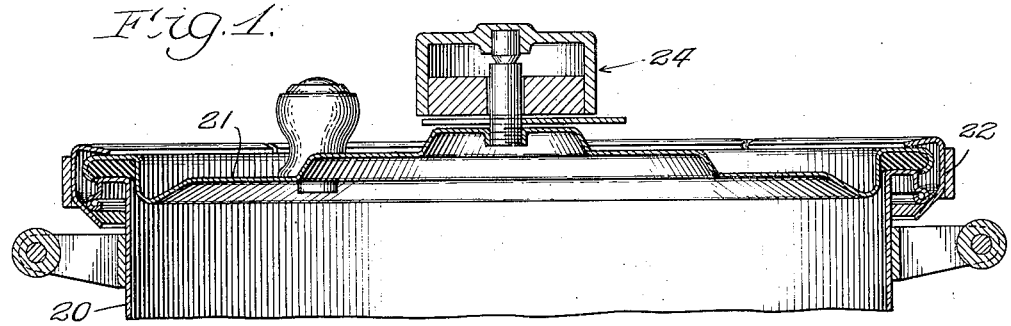
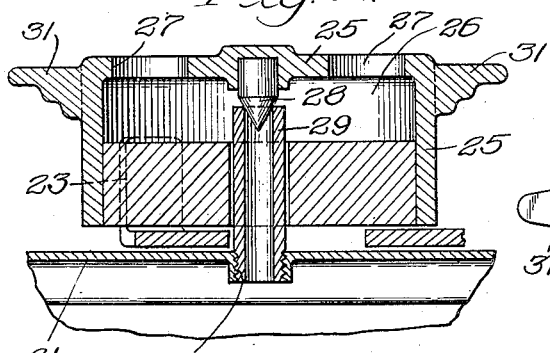
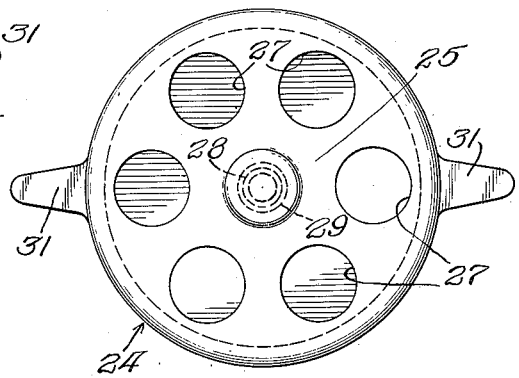
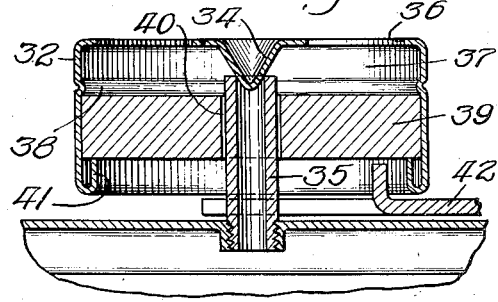
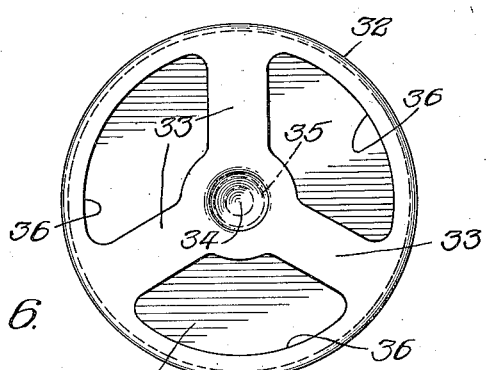
Inventor:
Percy W. Stephens

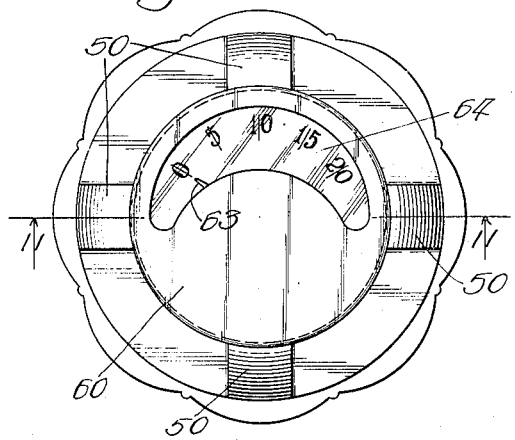
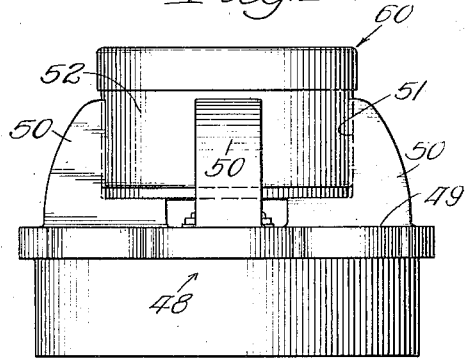
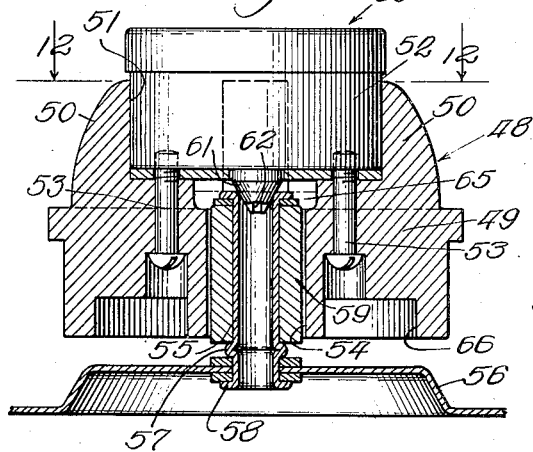
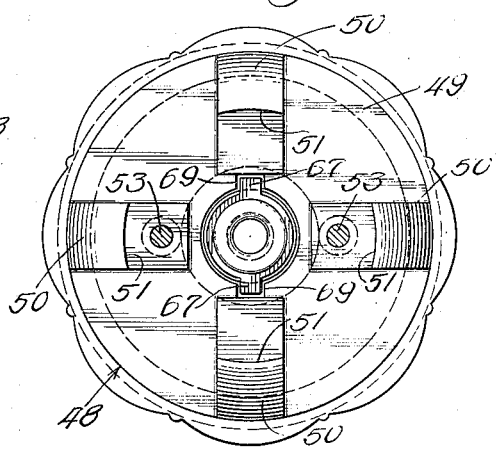
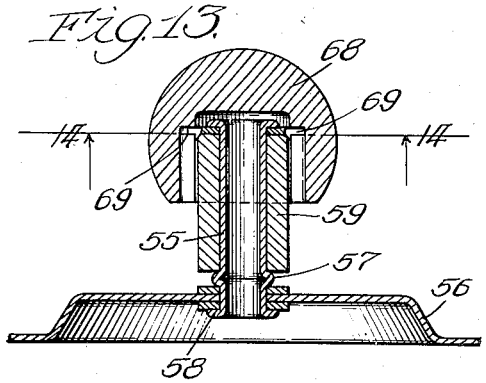
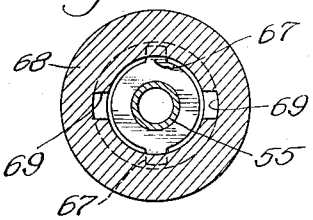

Patented May 14, 1940

2,200,903

UNITED STATES PATENT OFFICE 2,200,903

VALVE FOR PRESSURE COOKERS

Percy W. Stephens, Chicago, Ill.

Application February 4, 1937, Serial No. 124,127

2 Claims. (Cl. 53—2)

This invention relates to pressure cookers, and more particularly to improved safety valves therefor.

The present application is a continuation in part of application No. 89,189, filed July 6, 1936, for a Pressure cooker.

One feature of this invention is that it provides a safety valve for a pressure cooker; another feature of this invention is that the valve is so constructed and arranged as not to blow off operative position on the cooker upon escape of vapor therefrom; a further feature of this invention is that a chamber is provided adjacent the valve member for expansion of the released vapor; another feature is that the chamber communicates with atmosphere throughout a relatively large area, so that vapor may be readily vented from the chamber to atmosphere; yet another feature is that a pressure gauge may be incorporated with the safety valve; other features and advantages of this invention will be apparent from the following specification and the drawings, in which:

Figure 1 is a fragmentary sectional view of a pressure cooker having thereon a valve embodying this invention; Fig. 2 is a detailed sectional view of the valve arrangement shown in Fig. 1; Fig. 3 is a top plan view of the valve shown in Fig. 2; Fig. 4 is a vertical sectional view of a modified form; Fig. 5 is a top plan view of the valve shown in Fig. 4; Fig. 6 is a top plan view of another modification; Fig. 7 is a vertical sectional view along the line 7—7 of Fig. 6; Fig. 8 is a vertical sectional view along the line 8—8 of Fig. 6; Fig. 9 is a top plan view of a safety valve incorporating a pressure gauge; Fig. 10 is a side elevation of the valve shown in Fig. 9; Fig. 11 is a vertical sectional view along the line 11—11 of Fig. 9; Fig. 12 is a top view along the line 12—12 of Fig. 11; Fig. 13 is a vertical sectional view showing a lifting knob; and Fig. 14 is a horizontal sectional view along the line 14—14 of Fig. 13.

In order to protect against excessive pressures within a pressure cooker and to make it safe for normal household use, it is necessary to provide a relief valve in some part thereof, usually the cover. When pressure in the cooker rises above the desired maximum, this valve should vent the pressure without losing its operative relation with the cooker, so that when the pressure is reduced to a safe point, the valve will again close the opening and seal the cooker. Trouble has heretofore been experienced upon venting the pressures in that the valve has blown completely off the cooker or to such a position that it would not return to closed or sealing position when the pressure had dropped within safe limits.

The present invention provides a safety valve having a member adapted to close an opening communicating with the cover of the cooker. The valve body about the valve member has therein a relatively large chamber which communicates with atmosphere through a number of openings providing a relatively large area. This enables vapor within the cooker to expand in the chamber and vent to atmosphere without exerting sufficient upward pressure on the valve body to blow it off the cooker.

As discussed in the application of which this is a continuation, it is preferable to arrange interlocking means between the closure means sealing the cover to the cooker and the valve, so that the closure or cover can only be removed after the valve has been lifted to vent the pressure within the cooker to atmosphere. This prevents opening the sealing means and permitting the pressure to escape around the edges of the cover, with frequent danger of burns to the housewife. The present valve is particularly adapted to interlock with sealing or closure means operated through a toggle by a lever and so constructed and arranged that the lever is immediately adjacent and locked into the valve when the cover is sealed to the cooker.

In the particular embodiment of this invention illustrated herewith a cooker 20 is provided with a cover 21 adapted to be sealed on the upper end of the cooker body 20 by the wedging action of a flexible sealing ring 22. This sealing ring is drawn into sealing engagement by a manually operable lever having a portion 23 adapted to interlock with the valve and prevent removing of the seal until the valve has been lifted and the pressure within the cooker vented to atmosphere.

In the valve illustrated in Figs. 1 to 3, which valve was also fully shown and described in my application No. 89,189, a valve 24 has a valve body 25 which is shown as of cast metal. The valve body has a relatively large chamber 26 in the upper part thereof, with openings 27 through the top thereof giving communication between the chamber 26 and atmosphere. A cone shaped valve member 28 projects downwardly into the chamber 26 from the top of the valve body 25, and is adapted to close the opening at the top of the tube 29, which tube is threaded into an opening 30 in the cover 21, and thus communicates with the interior of the cooker. The valve body 25 is provided with handles 31 of heat insulating material enabling it to be conveniently removed when the cooker is hot. The internal diameter of the tube 29 and the weight of the valve 24 are so proportioned that pressures up to the desired maximum will not lift the valve member 28 from its sealing position in the top of the tube 29; as soon as the pressure within the cooker exceeds the desired maximum, however, the upward force exerted on the valve member 28 is sufficient to lift it from its seat in the top of the tube 29, thus venting the vapor pressure within the cooker into the chamber 26. Since this chamber is relatively large with respect to the size of the passage through the tube 29 and has a plurality of relatively large openings 27 in the top thereof communicating to atmosphere, the vapors coming up through the tube are able to expand in the chamber 26 and pass to atmosphere without their expansion reaction throwing the valve body up high enough to disturb the operative relationship between the conical valve member 28 and the tube 29. Thus after the pressure has vented itself to a safe point the valve 28 again drops into position, closing the tube 29. Inasmuch as a relatively large chamber is provided about the opening at the top of the tube, the vapors are enabled to expand sideways without exerting all of their force upwardly on the valve member; similarly, the large area of communication with atmosphere enables them to pass from the chamber to atmosphere without creating a back pressure which would tend to prevent ready passage of vapors from the tube into the expansion chamber. In the particular embodiment of this invention disclosed herewith the internal diameter of the tube is 3/32", and the valve weight eight ounces, the relief valve venting at a pressure of about fifteen pounds per square inch. If it is desired to have the pressure relieved at a lower point, a proportionately larger tube or smaller weight of valve should be used.

The particular modification of this invention illustrated in Figs. 4 and 5 is adapted to be cheaply made of sheet metal with a minimum of operations. The valve body 32 is here shown as of sheet metal having three arms 33 extending thereacross to form a spider supporting a bumped down conical portion 34 in the center, which portion forms the valve member adapted to close the tube 35. The spaces 36 between the arms 33 provide openings of relatively large area permitting communication between the chamber 37 and atmosphere. The side walls of the valve have a shoulder 38 bumped or stamped therein and adapted to form an upper stop against which a heavy annular washer or guide 39 of metal may abut. This metal serves as a weight to regulate the total weight of the valve, and is provided with an opening 40 therein disposed beneath the conical member 34 and adapted to receive a tube 35. At the bottom edge of the valve body the metal is turned inwardly and upwardly, as at 41, against the bottom of the metal weight 39 to hold it in position within the valve. This portion 41 also serves as an abutment against which the portion 42 of the sealing lever may be locked to prevent removal of the seal prior to venting of the pressure within the cooker.

In the modified form of this invention illustrated in Figs. 6 to 8, a construction is shown wherein the valve has a body portion 43 with a bridge member 44 lifted thereabove, and an opening 45 therein adapted to receive the tube extending out of the cover of the pressure cooker. A larger opening at the bottom of the valve provides a shoulder 46 against which the actuating means of the sealing device for the cover may be locked. The bridge carries a conical valve member 47 registering with the opening 45 and adapted to close the top of the tube with which the valve is used. In this modification the expansion chamber constitutes that portion about the tube beneath the bridge 44, and openings on each side of the bridge to atmosphere freely permit vapors to escape horizontally from the top of the tube through the partially enclosed chamber to atmosphere.

In addition to a safety valve, it is preferable to have a pressure gauge reading the pressure within the cooker in pounds per square inch, for example, and most pressure cookers are so provided. This is normally attached to the cover or to the body of the cooker as a separate and distinct unit from the safety valve. In the modification illustrated in Figs. 9 to 12, however, the pressure gauge and safety valve are incorporated in a single unit. The valve 48 is here shown as comprising a body portion 49 of heat insulating material, such as molded resin or phenolic condensation product. This body is provided with a plurality, here shown as four, of upwardly extending arms 50 forming a socket 51 therewithin adapted to receive a pressure gauge of common commercial type having an outer housing or casing 52 of substantially cylindrical shape. The gauge is held in the body portion 49 by any convenient means, here shown as two bolts 53 extending through openings in the body and threaded into the casing 52.

The body portion 49 has vertically, through the center thereof, an opening 54 adapted to surround the tube 55 extending up from the cover 56 of the cooker. This tube is shown as being locked to the cover between a shoulder 57 and a swedged portion 58. The tube 55 is here shown as surrounded with a tube 59 of heat insulating material similar to the body of the valve, which tube 59 is rigidly and permanently fastened to the tube 55 and is adapted to have the opening 54 in the body 49 slide readily thereover.

The casing of the pressure gauge 60 has at the bottom thereof a conical member 61 adapted to act as a valve member to close the top of the tube 55. This conical member 61 has therethrough at the axis thereof an opening 62, through which opening pressure within the cooker is admitted to the gauge to actuate pointer 63 on the scale 64 provided therefor. Inasmuch as this opening coincides with the apex of the conical member 61, it is always in communication with the pressure within the cooker, even when the conical member is sealing the tube 55 to prevent escape of vapor therefrom. Beneath the casing 52 and about the conical member 61 is an expansion chamber 65 communicating to atmosphere between the upwardly extending arms, so that a relatively large area of opening is provided between the chamber and atmosphere. The bottom of the body 49 is recessed to provide a shoulder 66 adapted to engage and lock the sealing means holding the cover on the cooker as previously described.

This valve is so proportioned as to weight in combination with the internal diameter of the tube 55, that it vents pressure to atmosphere to the desired maximum pressure. At the same time, the pressure existing within the cooker can be read from the scale 64 of the gauge, thus enabling the housewife to turn down the fire somewhat if the pressure rises too much, in order to prevent an undesired loss of vapors through the safety valve.

The tube 59 of heat insulating material about the metal tube 55 enables the cover to be readily picked up thereby after the valve has been removed from the tube. This tube is here shown as having a pair of projecting wings 67 lying in slots in the valve body 49 when the valve is in place thereover. Referring more particularly to Figs. 13 and 14, it will be seen that these wings 67 provide means for locking a knob 68 in place over the tube when the valve has been removed. The knob 68 is merely dropped over the tube with the wings 67 coinciding with slots 69 in the knob, and then given a partial turn to lock it in place. This knob, although not neccessary, may be used where it is desired to obviate any possibility of the hand being burned by contact with the metal tube 55 or by any residual vapor passing up through said tube. Where the cooker is being used as an ordinary kettle, and not under pressure, the valve and sealing means may be left off and the knob left in place over the tube during such usage.

While I have shown and described certain embodiments of my invention, it is to be understood that it is capable of many modifications. Changes, therefore, in the construction and arrangement may be made without departing from the spirit and scope of the invention as disclosed in the appended claims, in which it is my invention to claim all novelty inherent in my invention as broadly as permissible, in view of the prior art.

I claim:

1. A safety valve for a pressure cooker having a vertical tube opening therein, including: a valve member adapted to close the end of said tube and be supported thereby; a valve body of heat insulating material carried by said member and having upwardly projecting portions forming a socket; a pressure gauge adapted to be received by said socket and fastened therein, said gauge and body cooperating to form a chamber of relatively large dimensions surrounding said valve member and communicating to atmosphere through a relatively large area between said upwardly projecting portions; and means whereby said gauge communicates with said tube, said means comprising an opening through said valve member.

2. Apparatus of the character claimed in claim 1, wherein said tube is surrounded by a tube of heat insulating material fastened thereto.

PERCY W. STEPHENS.